(12) United States Patent
Ashmore et al.

(10) Patent No.: US 8,891,138 B2
(45) Date of Patent: Nov. 18, 2014

(54) ADAPTIVE FAX TIMERS WHICH ADJUST CURRENT TIME VALUE BASED ON PREDICTED RESPONSE TIME

(75) Inventors: Allan Ashmore, North Grafton, MA (US); John George Shaheen, III, Attleboro, MA (US)

(73) Assignee: Dialogic Corporation, Montreal (CA)

( * ) Notice: Subject to any disclaimer, the term of this patent is extended or adjusted under 35 U.S.C. 154(b) by 688 days.

(21) Appl. No.: 13/170,803

(22) Filed: Jun. 28, 2011

(65) Prior Publication Data

US 2013/0003132 A1    Jan. 3, 2013

(51) Int. Cl.
*H04N 1/32*     (2006.01)
*H04N 1/327*    (2006.01)
*H04N 1/00*     (2006.01)

(52) U.S. Cl.
CPC ....... *H04N 1/00933* (2013.01); *H04N 1/32765* (2013.01); *H04N 2201/0093* (2013.01)
USPC .......................................................... 358/442

(58) Field of Classification Search
USPC ................................................. 358/400–425
See application file for complete search history.

(56) References Cited

U.S. PATENT DOCUMENTS

| 5,599,274 | A  | * | 2/1997 | Widjaja et al. | 600/27 |
| 7,057,755 | B2 |   | 6/2006 | Yoshida | |
| 2003/0016395 | A1 | * | 1/2003 | Kajiwara | 358/402 |
| 2006/0218443 | A1 | * | 9/2006 | Fox et al. | 714/17 |
| 2008/0155153 | A1 | * | 6/2008 | Yoshii et al. | 710/262 |

* cited by examiner

*Primary Examiner* — Qian Yang
(74) *Attorney, Agent, or Firm* — Chapin IP Law, LLC (57) ABSTRACT

Timers involved in facsimile transmissions under the T.30 specification are permitted to adapt to a given situation to improve the chances for successful facsimile transmission over high latency communication networks. The specified T1 through T5 timers for facsimile transmission may be modified in value based on call control related parameters or facsimile transport related parameters. The timers may be set to have a particular range, with a nominal base value and a maximum value, which may exceed the T.30 timer specification. The adaptive timers can be modified based on a number of different criteria related to facsimile transmissions to avoid overlapping command-response situations and stalemates that may result from communications in relatively highly latency networks. The timers may also be adapted to minimize or optimize call length while achieving successful facsimile transmissions.

30 Claims, 5 Drawing Sheets

ADAPTIVE FAX TIMERS WHICH ADJUST CURRENT TIME VALUE BASED ON PREDICTED RESPONSE TIME

CROSS REFERENCE TO RELATED APPLICATION(S)

(Not Applicable)

STATEMENT REGARDING FEDERALLY SPONSORED RESEARCH OR DEVELOPMENT (Not Applicable)

BACKGROUND OF THE INVENTION

The present disclosure relates generally to compensation for facsimile transmission through several types of communication networks, and relates more particularly to adaptive facsimile timers that can compensate for timing issues encountered in facsimile transmission through several types of communication networks.

Facsimile document transmission continues to have an important role in business communications for a number of reasons, including the ability to transfer images not stored on a local computer, legal acceptance of handwritten signatures, real-time confirmation of receipt, confidence in what has been sent/received, and the ability to provide a 'tamper resistant' copy of the information transferred. Since facsimile-enabled devices can be used with existing telecommunications networks, their popularity has increased to the point where such devices enjoy the advantage of being ubiquitous and familiar to users on a global scale. Such devices also may be shared by a number of individuals, such as in a workplace environment, reducing costs while still allowing for the sending and receiving of documents to be relatively efficient among a group of persons.

While facsimile communications have previously been implemented over circuit switched networks, such as the publicly switched telephone network (PSTN), packet switched networks, such as Internet Protocol (IP) networks, have been implemented to carry communications including facsimile communications. As these different types of networks continue to coexist, translation and communication between them has become (and should continue to be) an important part of communications, including facsimile communications.

IP networks are inherently asynchronous; they also have a higher delay and are relatively 'lossy' (lose or drop packets) as compared to PSTN networks, which typically operate on a time-division multiplexed (TDM) basis. While these characteristics of IP networks are known to adversely impact both voice and facsimile communications, the impact to facsimile communications is typically more pronounced. Various solutions have been provided to address drawbacks related to IP network communications; however, such solutions have tended to be focussed on voice data and in many cases can cause more problems than they solve. Facsimile users thus have sometimes reported negative experiences when attempting to perform voiceband (non-T.38) facsimile transmissions over packet switched networks.

Translation between circuit-switched and packet-switched communication networks typically involves the use of translation between different protocols, and is often performed by gateways, sometimes referred to as IP media gateways. A gateway can carry different types of communications between various network types, such as an IP network and the PSTN. Such different types of communications may include voice or facsimile, for example. The gateway typically provides protocol translation service between the networks for these different types of communications. Facsimile transmissions typically adhere to the International Telecommunication Union (ITU) T.30 specification, and are often implemented using the realtime facsimile transmission specification under the ITU T.38 specification. The ITU T.30 and T.38 specifications are hereby incorporated herein by reference.

In a packet switched network that carries voice over IP (VoIP) communications, for example, individual blocks of data are transported with varying propagation delay depending upon the route taken and network conditions at the time, sometimes referred to collectively as "jitter." Compensation for jitter can be provided at a receiving end or midpoint of a network transmission path by providing sufficient overall throughput delay to accommodate the range of propagation delays, often implemented with a jitter buffer in a network component such as an IP media gateway. Individual packets that have been delayed sufficiently to fall outside of a range that can be accommodated by a given jitter buffer are considered lost or dropped.

The size of the jitter buffer is an important design consideration in constructing network components or networks in general. For example, a network component that implements a relatively large jitter buffer, with an attendant large overall delay, provides a greater tolerance to jitter and packet delays. However, if the jitter buffer size provides a significant overall delay, the result can be uncomfortably long pauses, which in turn can cause both parties to attempt to speak at the same time. Overall delays may also be observed on satellite connections, as a result of retry strategies between endpoints with a connection path that may span several types of communication networks, or when data compression is used, which is typically intended to decrease utilized bandwidth at the expense of added latency.

In general, facsimile transmissions can tolerate a relatively high overall delay in comparison to voice transmissions. However, when there is significant delay present, particularly when accumulated over multiple devices or network components, facsimile transmissions can fail due to the round trip delay exceeding T.30 timeout values. The T.30 facsimile protocol was designed for transmission using the general switched telephone network (GSTN), which in general is a relatively low latency network with a relatively small amount of loss of communication information during transmission. When significant delay is introduced into the communication network path, typical T.30 facsimile traffic can fail, due to the expiration of facsimile timers that are set in accordance with the T.30 specification. In contemporary communication networks, there are a number of sources of delays that can be introduced into communication pathways that cause T.30 facsimile traffic to fail. Some of these delay sources include the introduction of the real time IP facsimile protocol T.38, and network connections that relay or transcode data, which can be present in satellite connections and VoIP networks.

The real time IP facsimile protocol T.38 is relatively resilient to jitter and packet loss, especially if an optional redundancy mode is employed. However, significant delays can result when T.38 is used to implement facsimile over IP (FOIP) service, sometimes on the order of 1-1.5 seconds through a single gateway. The significant delay results from operations conducted in the gateway, including transcoding facsimile data and commands from T.38 IP packets to a PSTN modem generated audio signal, for example. When a facsimile transmission is provided over a network that includes multiple T.38 gateway hops, such as might be experienced with a tier II or III SIP trunk provider, the overall path delay can be on the order of several seconds. The facsimile communication path delay can be amplified due to different manufacturer gateway treatments as result of different manufacturers providing components to implement the communication network path, since delays can vary among the different manufacturer components. Moreover, a T.30 command often is made with the expectation of a response from the command destination, so that there is a roundtrip delay that can easily exceed typical T.30 specified timer constraints.

Some attempts have been made to permit adjustment of T.30 timers for accommodation of facsimile transmission failures due to excessive latency. However, in these conventional techniques, the adjustment of the T.30 timers is manual, so that facsimile transmission settings for facsimile endpoints is individualized on a case by case basis, and the settings are fixed until individually modified, usually by a trained technician on-site. Thus, facsimile transmissions to some endpoints can work with large timer values, whereas transmission to other endpoints do not work, since some endpoints may not have a similarly adjusted timer value. In addition, such manual adjustments may pose a problem for compliance with the T.30 standard, since some timer values may be extended outside the specified range for the T.30 standard.

It would be desirable to overcome the drawbacks related to facsimile transmissions in a communication network with relatively high latency. It would also be desirable to avoid facsimile transmission failure over relatively high latency communication networks.

SUMMARY

The present disclosure provides systems and methods for adapting timers in facsimile devices or endpoints to avoid facsimile transmission failure due to high latency communication network pathways. The times specified for facsimile devices or endpoints operating in accordance with the T.30 facsimile protocol automatically adapt in relation to the underlying transport in use and the conditions of a given transmission or pathway. The adaptability of the T.30 facsimile timers contributes to improving successful facsimile transmission under a wide range of conditions, and in particular with respect to communication networks with high latency pathways. The adaptability of the T.30 facsimile timers is implemented with the considerations of achieving a balance between attempting to maximize interoperability, while handling a wide range of transport delays and attempting to minimize call duration.

According to an aspect, the present disclosure varies T.30 facsimile timers in response to one or more factors. Some factors that may be considered in adapting the T.30 facsimile timers include, but are not limited to, network, device or endpoint configuration, negotiated parameters for facsimile transmission and accumulated and/or real time detection of parameters involved with facsimile transmission.

According to another aspect, the present disclosure modifies the timing values of timers T1, T2, T3, T4 and/or T5 that are identified in the T.30 facsimile transmission protocol. The adaptation of timers T1 and T3 may be based on factors such as: the configured call control interface, for example, PSTN or IP; a history of prior calls; and/or detected additional call management entities, for example, SIP registrars, gatekeepers and/or proxies. The T2, T4 and/or T5 timers can be adapted based on factors that may include: a configured media stream, for example, TDM, G711 RTP (real-time transport) and/or T.38; negotiated settings, for example G711 RTP, T.38 using UDPTL and/or secure facsimile transmission, such as may be implemented in a session based communication with transport layer security (TLS), secure RTP (SRTP) or secure T.38 transmission; reported roundtrip times that might be measured during initial call discrimination or when transmitting facsimile by G711 RTP; V.34 modem reported roundtrip delay; average high-level data link control (HDLC) command-response times; prior timer expirations, for example, if timer T4 expires, causing a repeat command due to a response not being received in time; detection of colliding or overdue HDLC responses, for example, responses received at the same time or after the corresponding command has been resent; history of prior calls; and/or detection of known gateway/relay equipment, for which timers might be adapted in accordance with a priori knowledge of the devices.

According to still another aspect, the present disclosure provides an adaptive range for T.30 timers. The adaptive range can be set based on a minimal specified value for a T.30 timer, with the provision of a range that is twice the stated T.30 timer value. The adaptive range can also be modified to be outside of the T.30 specified ranges, for example if measured factors indicate that a facsimile transmission would likely fail if the T.30 specified timer ranges were not exceeded. The adaptive values for the T.30 facsimile timers can be made to be dynamic, so that the range of values can change over a given period of time. A facility is provided to reduce the T.30 timer values as possible in accordance with observed operational parameters to contribute to reducing facsimile call length.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

Figure 1:
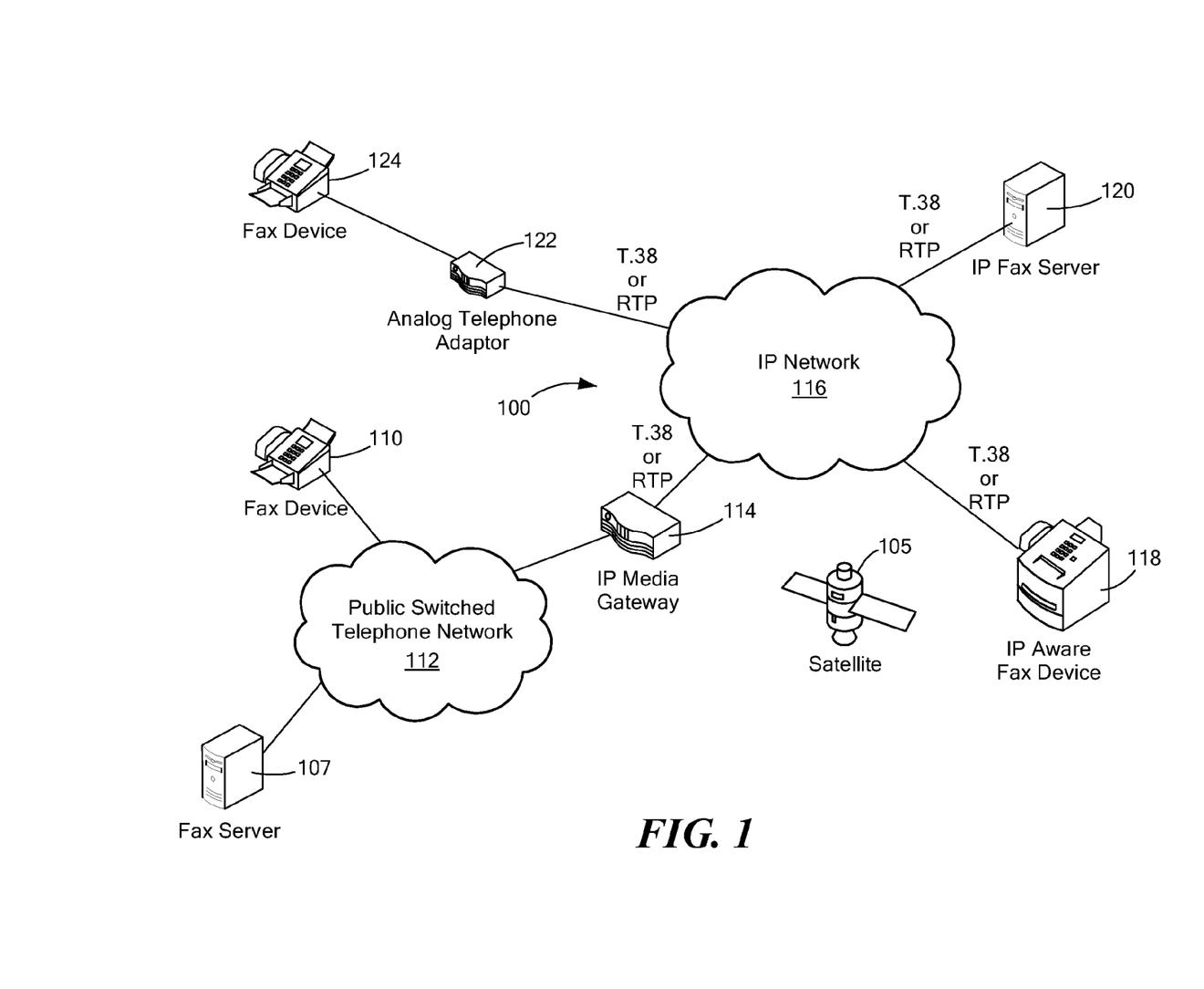
FIG. 1 is a diagram of network components in an exemplary communication network with circuit-switched and packet-switched components.

Referring to FIG. 1, an exemplary communication network 100 that permits facsimile transmission is illustrated. It is noted that the number, type, arrangement and/or capabilities, among other things, of some or all of the various devices shown in FIG. 1 may vary from that which is shown for various reasons (e.g., number of users of the network, location of the devices) and without undue experimentation.

In network 100, a facsimile server 107, a facsimile device 110 or a facsimile device 124 may originate or receive a facsimile transmission through analog signaling. For example, facsimile device 110 may originate or receive a facsimile transmission that is sent over a/the Public Switched Telephone Network (PSTN) 112. Facsimile server 107 or facsimile device 110 or 124 may operate using G3 (Group 3) type facsimile transmissions according to facsimile protocols such as the V.17, V.21, V.27 or V.29 facsimile protocols. Facsimile server 107 or facsimile devices 110 or 124 may operate using SG3 (Super Group 3) type facsimile transmissions according to the V.34 facsimile protocol. G3 and SG3 type facsimile communications conform to the ITU (International Telecommunication Union) Recommendation T.30 for facsimile transmission in the general switched telephone network, as may be implemented with network 100. PSTN 112 in network 100 may operate with communication protocols for a circuit-switched network, such as SS7, T1, E1 and other circuit-switched signaling and data communication protocols.

As shown, PSTN 112 is connected to an IP Media Gateway 114, which can perform translations between PSTN and protocols used in an IP network 116. IP network 116 is illustrated as a cloud to represent an implementation of the present disclosure in a cloud-computing type environment. A cloud-computing type environment is formed with multiple interconnected computing resources, such as computer servers, to permit communication and computing services to be shared and distributed or centralized, depending on a chosen paradigm. According to an exemplary embodiment, IP network 116 is a packet-switched network that may implement the Internet Protocol (IP) routing and addressing methodology to transfer data packets. IP network 116 may implement various transport protocols, which may include UDP, TCP, RTP, T.38 and other media and data communication protocols for packet-switched networks. IP network 116 may be implemented to provide realtime facsimile transmission support with facsimile transmission protocols such as the T.38 protocol for real time facsimile transmission. IP network 116 may include a number of network nodes (not shown) through which a facsimile transmission, originating at facsimile device 110, for example, may travel. A facsimile transmission or communication may include one or more of facsimile setup or control commands, training data or image data, any or all of which may be referred to herein separately or collectively as a facsimile transmission. The devices connected to IP network 116, such as IP facsimile device 118, IP facsimile server 120, analog telephone adapter 122, which can also serve as an IP Media Gateway, and IP Media Gateway 114 may implement various codecs and/or protocols to provide a variety of communication transmissions. A satellite 105 is also illustrated in network 100, to indicate that some network pathways through PSTN 112 and/or IP network 116 may optionally be provided via a satellite link.

Figure 5:
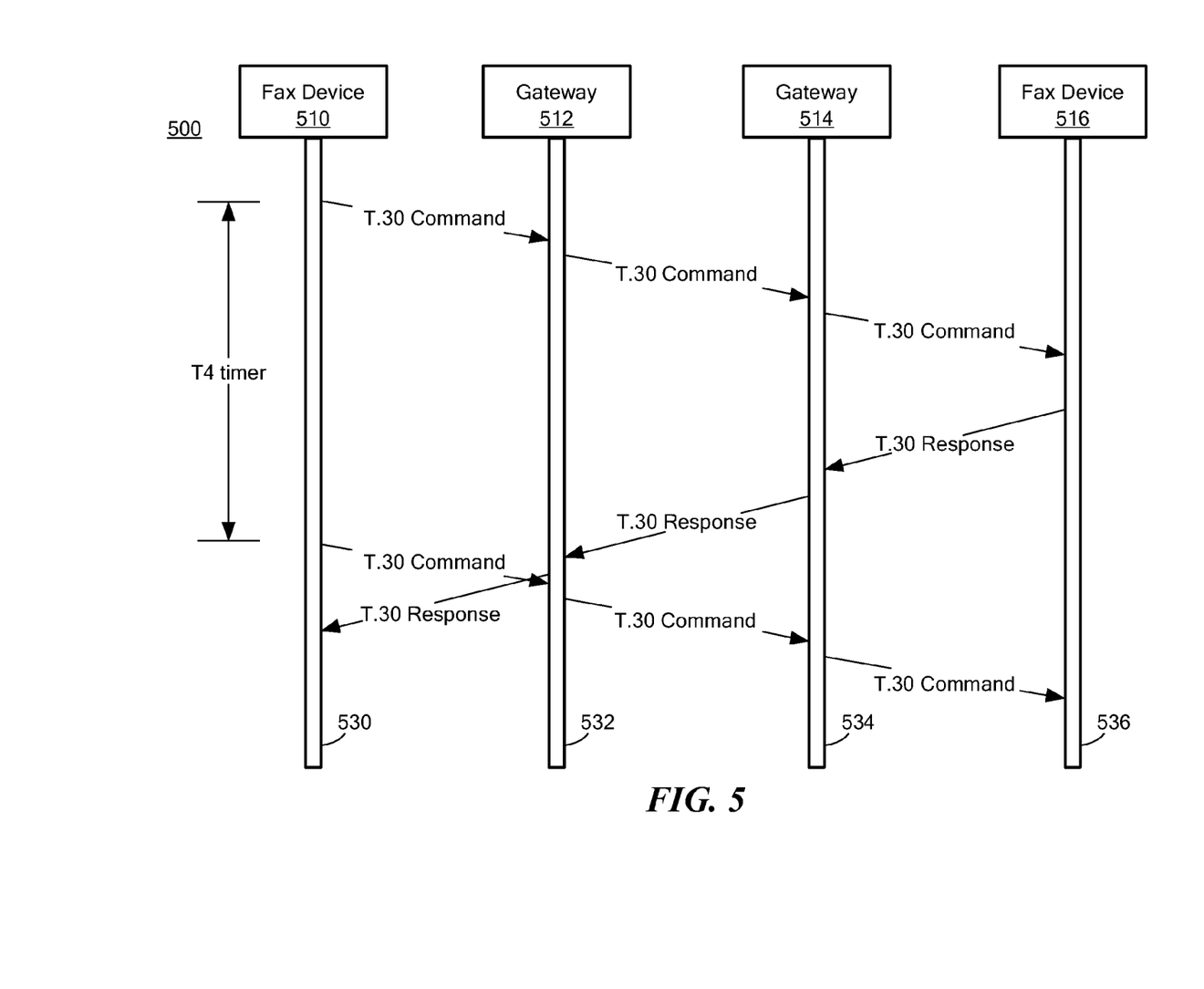
FIG. 5 is a message flow diagram illustrating exemplary command and response traversal of a communication network.

Referring now to FIG. 5, an exemplary message flow diagram 500 is provided to illustrate timing issues encountered during facsimile transmissions over high latency communication networks. In diagram 500, a T.30 command is originated from a facsimile device 510, which may be implemented as any of facsimile devices 110, 118, 124 or servers 107, 120 illustrated in FIG. 1. When facsimile device 510 initiates a T.30 command at point 530 in diagram 500, timer T4 is started to provide a time interval for receiving a response to the T.30 command. In the present disclosure, a timer value is referred to as the length of a time interval that a timer measures. In addition, a timer is started upon some event, such as the sending of a command, expiration of another timer or one or more other events associated with a facsimile transmission.

In diagram 500, the initial T.30 command is directed to a gateway 512, and arrives at point 532. Gateway 512 forwards the initial T.30 command to gateway 514 at point 534, and gateway 514 likewise forwards the initial T.30 command to facsimile device 516 at point 536 illustrated in diagram 500. Facsimile device 516 is a facsimile endpoint, which may be implemented as any of the facsimile devices 110, 118, 124 or servers 107, 120 illustrated in FIG. 1. Facsimile device 516 processes the initial T.30 command and provides a T.30 response that is returned to gateway 514 at point 534, which in turn returns the T.30 response to gateway 512 at point 532. Before gateway 512 can process and deliver the T.30 response to facsimile device 510, timer T4 expires, indicating that a response to the initial T.30 command has not been received. As a result, facsimile device 510 initiates a retry to resend the T.30 command from point 530 in diagram 500. Meanwhile, gateway 512 forwards the T.30 response from point 532 to facsimile device 510 at point 530, after the retry T.30 command is sent.

The network facsimile communication indicated in diagram 500 is relatively high latency, as illustrated by the difference in time between receiving and transmitting the T.30 command or response at each of gateways 512, 514. Due to the relatively high latency, the value of timer T4 at facsimile device 510 causes the timer to expire before receipt of the response to the T.30 command. The process of sending a T.30 command repeats three times until the call and facsimile transmission fails. When timer T4 has a fixed value, at both facsimile device 510 and facsimile device 516, the facsimile transmission will continue to fail until the network latency is reduced or until the value of timer T4 is modified. If however, facsimile device 510 is configured to have an adaptive timer T4, this type of above-described HDLC collision and stalemate can be avoided in accordance with the present disclosure. For example, if timer T4 can be adapted to extend the amount of time until expiration to permit the T.30 response to be captured, either initially or after one or more retries, the facsimile transmission is more likely to be completed successfully.

Figure 2:
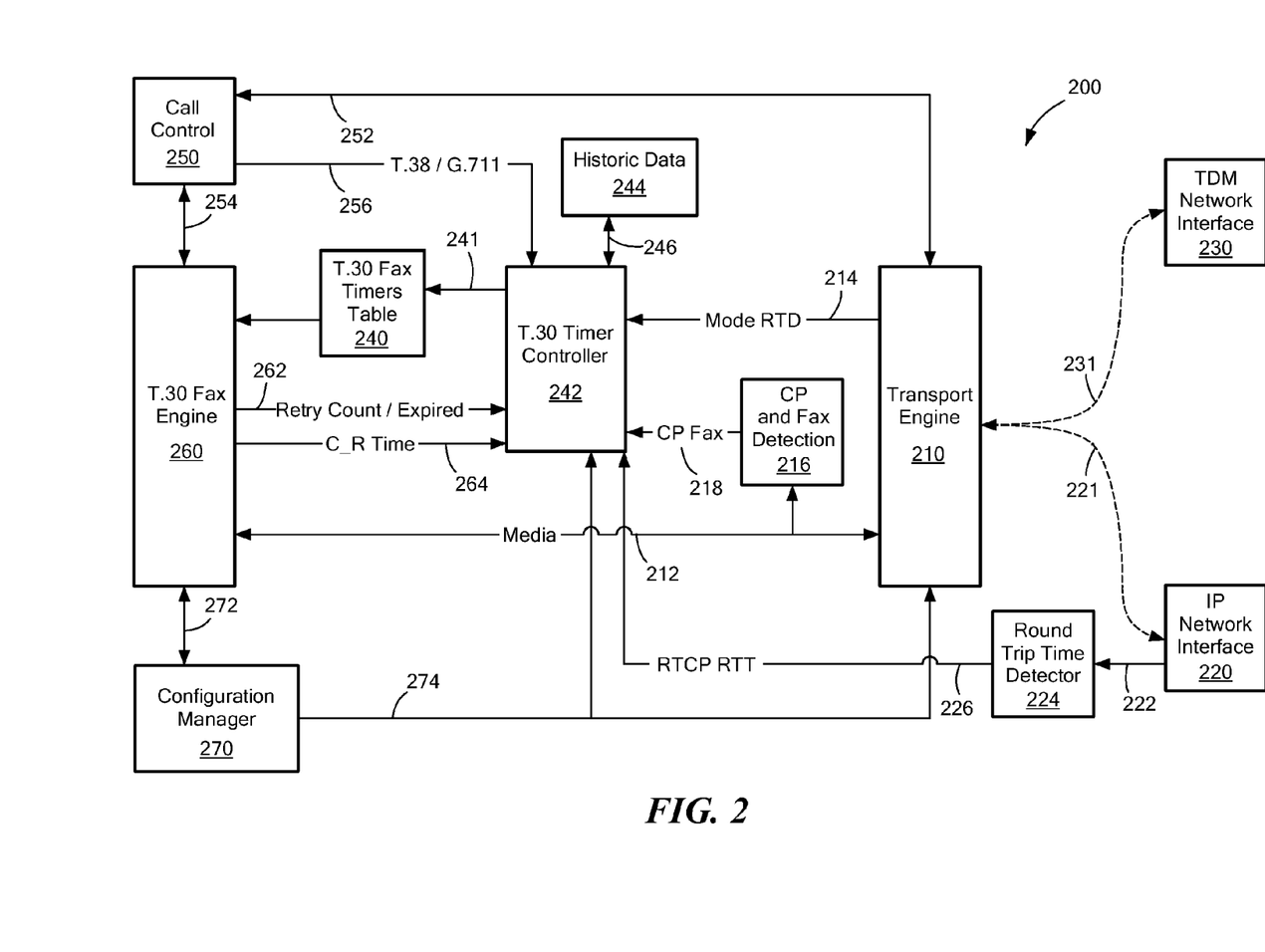
FIG. 2 is a block diagram of an exemplary facsimile endpoint of the exemplary communication network of FIG. 1.

Referring to FIG. 2, a block diagram of an exemplary facsimile endpoint 200 for sending and/or receiving facsimile transmissions in accordance with one or more exemplary embodiments of the disclosed systems and methods is illustrated. Facsimile endpoint 200 is illustrated as including an IP interface 220, which is a packet-switched interface, and/or a TDM interface 230, which is a circuit-switched or PSTN interface. The connections to IP interface 220 and TDM interface 230 are shown with dashed lines 221 and 231, respectively, to indicate that either or both of IP interface 220 and/or TDM interface 230 can be provided in facsimile endpoint 200. Accordingly, depending upon the facsimile or network application and the preference of the end-user, facsimile endpoint 200 may include facilities for being implemented as an IP facsimile endpoint such as IP facsimile server 120 or IP facsimile device 118, and/or may be implemented as a PSTN facsimile endpoint, such as facsimile server 107 or facsimile devices 110, 124, all of which facsimile endpoints are illustrated in FIG. 1. It is noted that although operations and/or components for handling both of these types of interfaces 220, 230 are described herein with respect to facsimile endpoint 200 depicted in FIG. 2, in a typical deployment of facsimile endpoint 200, a single interface would be used, and facsimile endpoint 200 can be configured to have a single set of components and functions to support the chosen interface, rather than supporting multiple interfaces. It is also noted that the connections illustrated by dashed lines 221 and 231 are bidirectional to permit facsimile transmissions to be sent or received over the respective IP or PSTN networks.

Facsimile endpoint 200 includes a transport engine 210 that can be implemented to process modem transmissions involving TDM interface 230 and/or T.38 transmissions that involve IP interface 220. Transport engine 210 encodes or decodes the transmitted media, as indicated in a pathway 212. In the case of a modem transmission, transport engine 210 provides a signal on pathway 214 to indicate a modem round trip delay (RTD). In addition, media pathway 212 is connected to or otherwise in communications with a detector 216 that can detect call progress (CP) tones, as well as facsimile transmission indicators. For example, detector 216 can detect different facsimile phases and call setup sequences for facsimile transmissions. Detector 216 supplies an output 218 related to detection of CP tones and/or facsimile transmission indicators.

In the case of IP interface 220 being present in facsimile endpoint 200, an interface output signal 222 is provided to a round trip time (RTT) detector 224. RTT detector 224 is able to measure a length of time that it takes for a facsimile-related signal (not shown) to be sent from IP interface 220 to a destination facsimile endpoint, plus a length of time for a return signal or acknowledgement to be received at IP interface 220. RTT detector 224 provides realtime transport control protocol (RTCP) RTT data on pathway 226 to a T.30 timer controller 242. RTCP provides statistical and control information for a realtime transport protocol (RTP) flow that can be used by T.30 timer controller 242 to control facsimile timers. The RTCP is generally used to provide feedback for quality of service in media distribution by periodically providing statistical information to participants in a streaming multimedia session.

Modem RTD signal 214, CP tones and facsimile output 218 and RTCP RTT signal 226 are all provided to T.30 timer controller 242 to contribute to determining how T.30 timers (e.g., T1-T5, as discussed herein) should be adapted in accordance with the present disclosure. T.30 timer controller 242 also receives parameters from other sources, with examples of such parameters including but not being limited to historical data, call control data, configuration data and retry/command-response time data. In the case of historical data, a memory storage 244 stores historical data and communicates with T.30 timer controller 242 over a bidirectional link 246. The historical data stored in memory storage 244 may include items such as, by way of non-limiting example, overall delay issues associated with certain sources or destinations of facsimile transmissions, and may be used to modify T.30 timers (e.g., T1-T5) in accordance with the present disclosure.

A call control unit 250 provides call control information to T.30 timer controller 242, based on (1) call control information provided to or received from transport engine 210 over call control signal pathway 252, and/or (2) call control information sent to or received from T.30 fax engine 260 over a signal pathway 254. Call control information provided by call control unit 250 is delivered to T.30 timer controller 242 over signal pathway 256 and may include information specific to the protocol or codec used during the facsimile call, including such protocols and/or codecs as T.38 and/or G.711.

T.30 fax engine 260 also provides signals to T.30 timer controller 242, which so provided signals are illustrated as a retry count/expired signal 262 and a command-response (CR) timeframe signal 264. T.30 facsimile engine 260 uses inputs received on media pathway 212, call control signal pathway 254 and a configuration manager input on signal pathway 272 to derive and output signals 262 and 264 based on the T.30 facsimile standard. Thus, T.30 facsimile engine 260 provides the mechanism for implementing the T.30 facsimile standard for facsimile transmission and reception. T.30 facsimile engine 260 therefore operates with set values for timers T1-T5 used in determining T.30 facsimile operations.

T.30 timer controller 242 also receives input from configuration manager 270 over pathway 274, which provides information regarding interface and media transport type. For example, configuration manager 270 can provide information regarding characteristics of the interface type, which can include, also for example, a PSTN interface or an IP interface.

Configuration manager 270 can also provide information related to the transport type which may include TDM, G711 RTP or T.38. The configuration information from configuration manager 270 is provided on pathway 274 to transport engine 210 to configure the type of transport for the given interface and/or to configure transport settings for the facsimile transmission. In addition, the configuration information from configuration manager 270 is communicated to T.30 timer controller 242 over signal pathway 274 to permit adaptive timer calculations to be carried out based on at least the interface type and/or transport type.

T.30 timer controller 242 receives inputs from various sources that can contribute to calculating timer parameters for T.30 timers T1-T5. In accordance with the present disclosure, T.30 timer controller 242 can modify the timer length values for call control related timers T1 and T3. The parameters used to modify timers T1 and T3 can include, by way of non-limiting examples: the configured call control interface, such as PSTN or IP; history of prior calls; and detected additional call management entities, such as SIP registrars, gate keepers and/or proxies. Call management entities can be detected based on call control messages received from call control unit 250 on signal pathway 256, and also through CP tone and facsimile detector 216 through output 218. It is possible to use RTT detector 224 to provide information related to call management entities through use of the RTCP protocol, which information can be provided to T.30 timer controller 242 over signal pathway 226.

T.30 timer controller 242 may also modify facsimile transport related timers T2 and T4-T5 based on facsimile transmission related parameters. Those parameters may include, by way of non-limiting examples: the configured media stream, such as TDM, G711 RTP, T.38; negotiated settings, such as G711 RTP or T.38 or secure fax; RTCP reported RTT during initial call discrimination or when using G711 RTP during facsimile transmissions; V.34 modem reported RTD; average HDLC CR times; prior timer expirations, such as timer T4 expiring and causing a repeat command as a result of "response not received in time" event; detection of colliding or overdue HDLC responses, where the responses are received at the same time or after the corresponding command has been resent; history of prior calls; and detection of known gateway/relay equipment, for which timers may be adapted in known ways based on the detected equipment.

T.30 timer controller 242 may thus modify any of timers T1-T5 in accordance with the T.30 facsimile standard and produce adapted values that are provided to a timer table 240 over a signal pathway 241. Timer table 240 is used by T.30 facsimile engine 260 in determining how long each of timers T1-T5 should run until expiration during facsimile transmission operations. Accordingly, T.30 facsimile engine 260 uses the values that are modified and/or stored in timer table 240 as a result of calculations performed by T.30 timer controller 242. In this way, T.30 facsimile engine 260 provides control for facsimile transmission operations in accordance with adaptive time values for timers T1-T5.

T.30 timer controller 242 may include range value limitations for each of timers T1-T5, which range value limitations may be modified depending upon operational circumstances. For example, T.30 timer controller 242 can set an adaptive range to be between a minimum specified value for the T.30 timers, and twice the nominal T.30 stated value. T.30 timer controller 242 can also place limitations on the timer ranges so that the timer values remain within the T.30 specified ranges, unless operational circumstances indicate that benefits may be obtained by exceeding the specified T.30 timer ranges. For example, T.30 timer controller 242 may determine that a facsimile transmission is likely to fail unless certain timer values are extended to exceed the specified T.30 timer value ranges.

Table 1, below, shows T.30 timer values defined in ITU T.30 (09/2005).

TABLE 1

| Timer | Value | Description |
| --- | --- | --- |
| T1 | 35 ± 5 s | The amount of time two terminals will continue to attempt to identify each other. |
| T2 | 6 ± 1 s | Tight control between commands and responses to detect the loss of command/response synchronization. |
| T3 | 10 ± 5 s | The amount of time a terminal will attempt to alert the local operator in response to a procedural interrupt. |
| T4 | 3 s ± 15% Auto mode 4.5 s ± 15% Manual mode | Time to receive a response to a command. |
| T5 | 60 ± 5 s | Defines the amount of time waiting for clearance of the busy condition of the receiving terminal. |

ITU T.38 permits the extension of T.30 timers to twice or three times their T.30 values in certain circumstances. For example, when the endpoints of a facsimile transmission are aware of facsimile devices, extension of the T.30 timer values to twice or three times their nominal values is permitted. Internet aware facsimile devices are indicated in a facsimile transmission with a bit 123 in the digital identification signal (DIS)/digital command signal (DCS) negotiation. Another convention of the T.38 standard provides that if silence is detected on the transmission media line for more than seven (7) seconds, an autonomous transition back to voice may occur.

Figure 3:
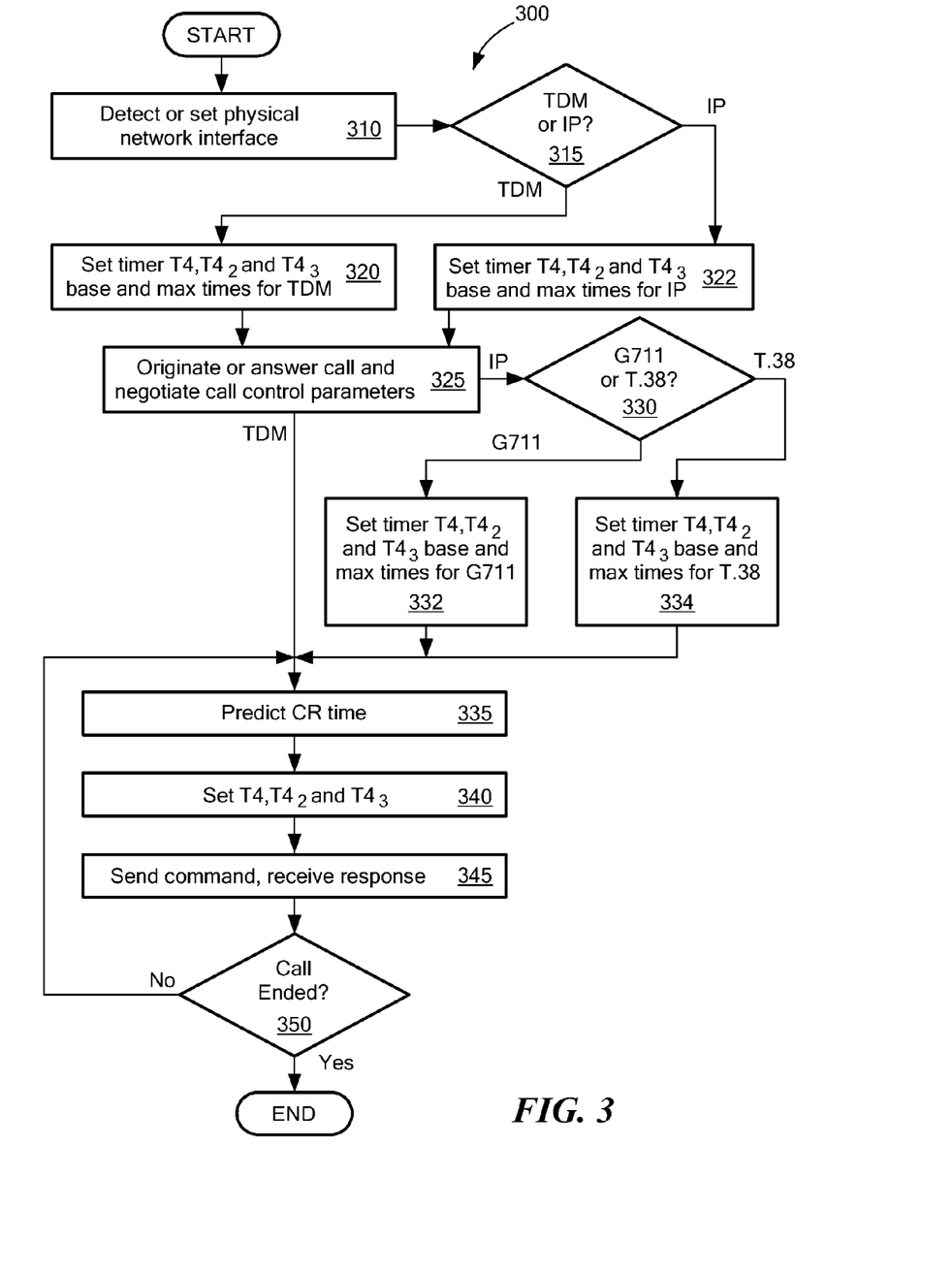
FIGS. 3-4 are flowcharts illustrating exemplary timer adaptation processes.

Referring now to FIG. 3, an exemplary embodiment of a process flow according to the disclosed systems and methods is illustrated as flowchart 300. The process illustrated in flowchart 300 begins with a step of detecting or setting the physical network interface, based on configured parameters in, for example, facsimile endpoint 200 (FIG. 2), as illustrated in block 310. A decision block 315 illustrates the determination of a TDM or IP interface. Timer T4 and retry timers $T4_2$ and $T4_3$ are each set in accordance with the respective physical network interface, as illustrated in blocks 320 and 322, which are respectively reached by taking a TDM or IP branch from decision block 315. An exemplary base time for timer T4 for a TDM interface is about three (3) seconds, whereas an exemplary maximum time for timer T4 for a TDM interface is about 5.175 seconds. Retry timers $T4_2$ and $T4_3$ may be set for a TDM interface, as illustrated in block 320, and may respectively have about 40% and 60% greater base values than timer T4, while having a maximum value of about 5.175 seconds, according to an exemplary embodiment. For timer T4 with an IP interface, as illustrated in block 322, an exemplary base time is about 3.45 seconds, with an exemplary maximum time of about 5.175 seconds. Retry timers $T4_2$ and $T4_3$ may be respectively increased over timer T4 by about 40% and 60% with respect to a base value, and have a maximum of about 5.175 seconds.

Once the base and maximum times for timer T4 and retry timers $T4_2$ and $T4_3$ are set according to the physical network interface, the call may be originated or answered, and call control parameters are negotiated, as illustrated in block 325. In the case of a TDM physical network interface, the values for timer T4, and retry timers $T4_2$ and $T4_3$ can remain unchanged after call control negotiation, as illustrated by the path taken from block 320 through block 325 to block 335. However, in the case of the physical network interface being an IP interface, timer T4, and retry timers $T4_2$ and $T4_3$ can be set differently depending, for example, upon the call control negotiated parameters. The impact of the call control negotiated parameters is illustrated by the pathway from block 322 through block 325 to decision block 330 for an IP physical network interface.

For an IP physical network interface, the call control parameters can be negotiated to determine that the facsimile call will take place using a G711 codec/protocol or the T.38 protocol. The determination of which protocol is to be used is illustrated in decision block 330. If G711 is to be used for the facsimile call, timer T4 and retry timers $T4_2$ and $T4_3$ can be set to have different base and maximum times, as illustrated in block 332. For example, timer T4 may be set to have a base value of about 3.45 seconds and a maximum value of about 5.175 seconds, with retry timers $T4_2$ and $T4_3$ being set respectively to about 40% and 60% greater for the base value, with a maximum value of about 5.175 seconds, for example.

If the transport protocol is negotiated to be T.38, timer T4 and retry timers $T4_2$ and $T4_3$ are set accordingly, as illustrated in block 334. For example, timer T4 can be set to have a base value of about 4.5 seconds, with a maximum value of about nine (9) seconds. Note that a nine second maximum value for timer T4 implies that the maximum value can be about twice the nominal value defined by the T.38 standard in manual mode, as indicated in Table 1, above. Retry timers $T4_2$ and $T4_3$ may be respectively set to about 40% and 60% higher values for the base value, and have a maximum value of about nine (9) seconds for the T.38 protocol.

Once the initial settings for timer T4 and retry timers $T4_2$ and $T4_3$ are set as described above, a command-response (CR) time can be predicted, as illustrated in block 335. The prediction of a CR time can be based on a number of factors, including, for example, prior actual CR times and/or CR times derived from the underlying transport, such as TDM, G711 RTP or T.38. Alternatively, or in addition, a CR time can be obtained from RTCP RTT reports or V.34 RTD values, coupled with an average response time for facsimile machines. Referring briefly again to FIG. 2, prior actual CR times may be obtained from historic data 244, whereas the configured underlying transport information may be drawn from configuration manager 270 and/or call control unit 250. The RTCP RTT reports or V.34 RTD values may be derived from RTT detector 224 or from historic data 244, as well as from transport engine 210, in the case of V.34 RTD values.

Referring once again to FIG. 3, given the predetermined base and maximum times for timer T4 and retry timers $T4_2$ and $T4_3$, the predicted CR time can be used to adjust the values for each of timer T4 and retry timers $T4_2$ and $T4_3$, as is illustrated in block 340, which is reached from block 335. The values for timer T4, and retry timers $T4_2$ and $T4_3$ are based on the predicted CR time within the range of the base to maximum time as determined previously. For example, timer T4 can be set to the predicted CR time plus about 10%, whereas retry timers $T4_2$ and $T4_3$ can respectively be set to be predicted CR time plus about 40% or plus 60%. Setting the retry timers $T4_2$ and $T4_3$ to have different, increasing time values can help to avoid a stalemate, and permits the retry timers to extend beyond the T.30 specification in case of an error state or event to contribute to improving the chance for completing the facsimile transmission.

Once the timer T4, and retry timers $T4_2$ and $T4_3$ are each set to a given value within their established ranges, a command may be sent or received, prompting a response to be received or sent, respectively. With the sending and receiving of a response to the command, as illustrated in block 345, additional data related to the facsimile transmission can be obtained, such as actual CR times or reported transport times. In the event that the CR time or reported transport times are decreased, a decrease in the value of timer T4 and retry timers $T4_2$ and $T4_3$ can be obtained to help reduce overall facsimile call time. If the actual CR time or reported transport times are greater than those obtained previously, then timer T4 and retry timers $T4_2$ and $T4_3$ can be increased to avoid problems with missed responses or overlapping command/responses to improve the robustness of the facsimile transmission.

A decision block 350 illustrates the determination of whether the facsimile call has ended, so that the cycle of predicting CR times and setting timer T4, and retry timers $T4_2$ and $T4_3$ can be repeated to permit the timer and retry timers to adapt to the given transmission situation, as illustrated by the "No" branch being taken from decision block 350 to block 335. If the facsimile call is terminated, whether through normal call termination or by expiration of a given timer or retry timer, no further adjustments are made to the timer or retry timers, as illustrated by the "Yes" branch being taken from decision block 350.

It should be noted that retry timers $T4_2$ and $T4_3$ can represent the T4 timer as used for a second or a third retry attempt when a first command-response sequence was interrupted or improperly executed, as can occur, for example, if portions of the transmission were lost or dropped, or are significantly overdue. If a command is resent because the T4 timer has expired, and the response to the original command was received too late, the predicted CR time can be increased to extend timer T4, such that retry timers $T4_2$ and $T4_3$ represent extended timer T4. By extending timer T4 in accordance with the present disclosure, such as can be represented by retry timers $T4_2$ and $T4_3$, there is an opportunity for properly receiving a delayed response to another or retried command.

Figure 4:
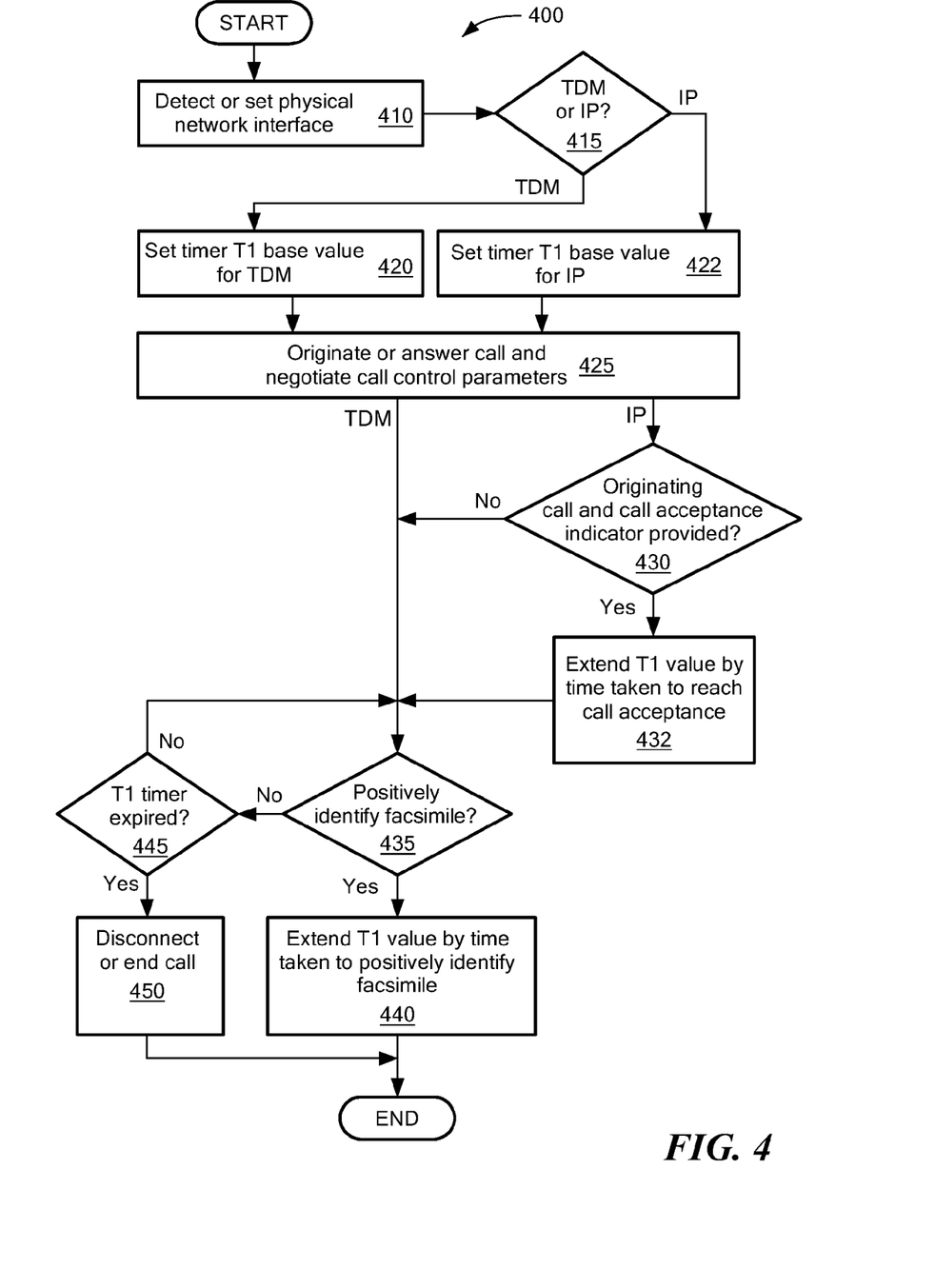

Referring now to FIG. 4, a flowchart 400 illustrates a process for setting and adapting timer T1 that is defined within the T.30 specification. The process illustrated by flowchart 400 begins with the detection or setting of the physical network interface for the given facsimile transmission, as illustrated in block 410. The physical network interface may be a TDM interface or an IP interface, for example. If the physical network interface is TDM, timer T1 is accordingly set to have a base value for TDM, as illustrated in block 420, which is reached through the TDM branch of decision block 415. If the physical network interface is IP, timer T1 is set accordingly to have a base value in relation to an IP interface, as illustrated in block 422, which is reached by the IP branch of decision block 415. In the case of a TDM interface, the base value for timer T1 may be set to about 35 seconds, for example, while in the case of an IP interface, timer T1 may be set to have a base value of about 40 seconds.

The process illustrated in flowchart 400 continues with the origination or answering of a facsimile call, and negotiation of call control parameters as illustrated in block 425. Note that the process illustrated in block 425 occurs whether the interface type is TDM or IP, as illustrated by the two separate paths through block 425.

When the interface type is determined to be IP, a determination is made as to when the facsimile device, such as facsimile endpoint 200 (FIG. 2) is originating a call. If the facsimile device is originating a call, and the negotiated call control protocol provides an indication of call acceptance, timer T1 can be extended by the time that is taken to reach call acceptance, as illustrated in block 432, which is reached by the "Yes" branch of decision block 430. If the facsimile device is not originating a call, or is not provided with a call acceptance indication based on the negotiated call control protocol, in the case of an IP interface, timer T1 is not extended, as illustrated by the "No" branch being taken from decision block 430.

Processing of the facsimile call continues with positive identification of a facsimile call, as is determined during the identification phase of the facsimile call, as illustrated in decision block 435. The identification phase continues, as indicated by the "No" branch taken out of decision block 435, and a determination is made as to whether timer T1 has expired, as illustrated in decision block 445. The expiration of timer T1 indicates facsimile endpoints participating in the facsimile transmission have been unable to identify each other within the T1 timeframe. If timer T1 has not expired during the identification phase, then attempts by the facsimile endpoints to identify each other continue, as indicated by the "No" branch being taken out of decision block 445 to the input of decision block 435. If timer T1 does expire during the identification phase, as illustrated by the "Yes" branch being taken out of decision block 445, the facsimile call is disconnected or ended, as indicated in block 450, which is reached through the Yes branch of decision block 445. If the facsimile call is ended or disconnected, the facsimile endpoints may initiate a later retry of the facsimile call, which would reinitiate the process illustrated in flowchart 400.

If the facsimile endpoints (also referred to as terminals) are able to positively identify each other during the identification phase, then timer T1 is extended by the amount of time taken by the facsimile endpoints to identify each other, as illustrated in block 440, which is reached through the Yes branch from decision block 435. In such a case, the extended value for timer T1 can be stored for later reference for the particular set of facsimile endpoints involved in the facsimile transmission. The one or more time extensions that may take place as a result of the process illustrated in flowchart 400 may also be stored in historical data 244 (FIG. 2), so that further facsimile transmissions between the facsimile endpoints can be set up to have an improved chance for success, based on adapting the value of timer T1.

While examples are provided above with respect to adapting timer values for timers T1 and T4, it should be apparent to those of ordinary skill in the art that any of timers T1-T5 defined in the T.30 specification can be modified in terms of timer value range. For example, any or all of timers T1-T5 can be given a base value and a maximum value as a range within which a timer value can be set, as indicated in Table 1, above. The timer values and base and maximum values can be adjusted in accordance with circumstances involving the facsimile devices and facsimile transmission operation. Therefore, the examples given above are understood to be extended to timers T2-T3 and T5 with respect to the individual roles of the timer values and the various considerations listed above involving call control and facsimile transport.

The operations herein depicted and/or described herein are purely exemplary and imply no particular order. Further, the operations can be used in any sequence when appropriate and can be partially used. With the above embodiments in mind, it should be understood that they can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed systems and methods can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the disclosure.

What is claimed is:

1. A facsimile device for processing a facsimile call, comprising:
   a memory storage for storing a current timer value used in the facsimile call;
   a timer controller communicatively coupled to the memory storage and being responsive to at least one input related to operation of the facsimile device to generate and store the current timer value in the memory storage,
   wherein the timer controller is operative to predict, based at least on the at least one input, a response time for a facsimile endpoint device participating in the facsimile call, and to adjust the current timer value based on the predicted response time; and
   a processing engine communicatively coupled to the memory storage and being operative to access and apply the adjusted current timer value in processing the facsimile call.

2. The device according to claim 1, wherein a previous timer value that is stored in the memory storage is used as the at least one input to generate the current timer value.

3. The device according to claim 2, wherein the processing engine is further operative to receive data including an actual response time for the facsimile endpoint device, and wherein the timer controller is further operative to increase or decrease the previous timer value based on the actual response time, and to predict, based at least on the increased or decreased previous timer value, the response time for the facsimile endpoint device.

4. The device according to claim 3, wherein the timer controller is operative to generate the current timer value within a range by adding or subtracting a percentage of the previous timer value respectively to or from the previous timer value.

5. The device according to claim 1, further comprising:
   a control component communicatively coupled to the timer controller and being operative to determine a parameter value related to facsimile call processing and to provide the so determined parameter value to the timer controller as an input to which the timer controller is responsive.

6. The device according to claim 5, wherein the control component includes one or more of a call control unit, a storage device for storing historical facsimile call data, a detector for call progress tones or facsimile transmission, a transport engine, a configuration manager or a round trip time detector.

7. The device according to claim 6, wherein the parameter value is related to one or more of call control or facsimile transport.

8. The device according to claim 7, wherein the current timer value is for a timer defined under the T.30 specification for facsimile communication.

9. The device according to claim 7, wherein the parameter value relates to call control and is associated with one or more of an interface configuration, a prior call history or an external call management entity.

10. The device according to claim 7, wherein the parameter value relates to facsimile transport and is associated with one or more of a media stream configuration, call control negotiated settings, reported round trip times, reported round trip delay, average command-response times, prior timer expirations, detection of colliding or overdue responses to commands, a prior call history or detection of known gateway or relay equipment.

11. The device according to claim 1, wherein the timer controller is operative to set one or more of a timer value minimum or a timer value maximum.

12. The device according to claim 1, wherein the timer controller is operative to increase the previous the timer value to generate the current timer value, and the facsimile processing engine is operative to provide a command retry with the so generated current timer value to receive a response to the command before the so generated current timer value expires.

13. The device according to claim 1, wherein the processing engine is further operative to initiate a message for receipt at the facsimile endpoint device, and to receive a response to the message from the facsimile endpoint device within a time interval based on the adjusted current timer value.

14. A method of processing a facsimile call with a facsimile endpoint device, comprising:
   receiving, at a facsimile device, a parameter value related to processing the facsimile call;
   generating, by the facsimile device, a current timer value for use in processing the facsimile call, based at least in part on the received parameter value, the generating of the current timer value including:
      predicting, based at least on the received parameter value, a response time for the facsimile endpoint device; and
      adjusting the current timer value based on the predicted response time;
   storing the adjusted current timer value in a memory storage that is accessible for processing the facsimile call; and
   processing, by the facsimile device, the facsimile call using the adjusted current timer value.

15. The method according to claim 14, wherein receiving a parameter value further comprises:

retrieving a previous timer value from the memory storage.

16. The method according to claim 15, further comprising:
receiving, at the facsimile device, data including an actual response time for the facsimile endpoint device, and wherein the generating of the current timer value further comprises:
increasing or decreasing the previous timer value based on the actual response time; and
predicting, based at least on the increased or decreased previous timer value, the response time for the facsimile endpoint device.

17. The method according to claim 16, further comprising generating the current timer value within a range by adding or subtracting a percentage of the previous timer value respectively to or from the previous timer value.

18. The method according to claim 16, further comprising:
generating the current timer value by increasing the previous timer value; and
providing a command retry with the so generated current timer value to receive a response to the command before the so generated current timer value expires.

19. The method according to claim 14, further comprising:
determining the parameter value based at least in part on one or more of call control data or facsimile transport data.

20. The method according to claim 19, further comprising:
determining the parameter value based at least in part on facsimile transport data in relation to one or more of a media stream configuration, call control negotiated settings, reported round trip times, reported round trip delay, average command-response times, prior timer expirations, detection of colliding or overdue responses to commands, a prior call history or detection of known gateway or relay equipment.

21. The method according to claim 14, wherein the current timer value is for a timer defined under the T.30 specification for facsimile communication.

22. The method according to claim 21, further comprising:
determining the parameter value based at least in part on call control data in relation to one or more of an interface configuration, a prior call history or an external call management entity.

23. The method according to claim 14, further comprising:
setting one or more of a timer value minimum or a timer value maximum.

24. The device according to claim 14, wherein the processing of the facsimile call includes:
initiating a message for receipt at the facsimile endpoint device; and
receiving a response to the message from the facsimile endpoint device within a time interval based on the adjusted current timer value.

25. A method of implementing a timer in a facsimile device, comprising:
receiving, at the facsimile device, a parameter value related to operation of the facsimile device;
generating, by the facsimile device, a current timer value based at least in part on the parameter value, the generating of the current timer value including:
predicting a response time based at least on the parameter value; and
adjusting the current timer value based on the predicted response time; and
using the adjusted current timer value for operation of the facsimile device.

26. The method according to claim 25, wherein the using of the adjusted current timer value comprises:
processing, by the facsimile device, a facsimile call using the adjusted current timer value, the processing of the facsimile call including:
initiating a message for receipt at a facsimile endpoint device; and
receiving a response to the message from the facsimile endpoint device within a time interval based on the adjusted current timer value.

27. A method of processing a facsimile call with a facsimile endpoint device, comprising:
in a receiving step, receiving, at a facsimile device, a parameter value related to processing the facsimile call;
in an obtaining step, obtaining, by the facsimile device, a response time for the facsimile endpoint device based at least on the parameter value;
in an adjusting step, adjusting, by the facsimile device, a timer value based at least on the response time to obtain an adjusted timer value;
while the facsimile call is in progress, repeating, one or more times, the receiving step, the obtaining step, and the adjusting step to repeatedly obtain the adjusted timer value using one or more subsequently received parameter values; and
processing, by the facsimile device, the facsimile call using the adjusted timer value.

28. The method according to claim 27, wherein the processing of the facsimile call includes:
initiating a message for receipt at the facsimile endpoint device; and
receiving a response to the message from the facsimile endpoint device within a time interval based on the adjusted timer value.

29. The method according to claim 27, further comprising:
storing, in a memory storage, the adjusted timer value as a stored adjusted timer value.

30. The method according to claim 29, wherein the adjusting of the timer value is further based at least on the stored adjusted timer value.

* * * * *